(12) United States Patent
Jiang

(10) Patent No.: US 10,895,980 B2
(45) Date of Patent: Jan. 19, 2021

(54) ELECTRONIC SYSTEM WITH PALM RECOGNITION, VEHICLE AND METHOD FOR OPERATING THE SAME

(71) Applicant: Yu-Sian Jiang, Austin, TX (US)

(72) Inventor: Yu-Sian Jiang, Austin, TX (US)

(*) Notice: Subject to any disclaimer, the term of this patent is extended or adjusted under 35 U.S.C. 154(b) by 0 days.

(21) Appl. No.: 16/677,608

(22) Filed: Nov. 7, 2019

(65) Prior Publication Data

US 2020/0150861 A1 May 14, 2020

Related U.S. Application Data

(60) Provisional application No. 62/757,744, filed on Nov. 8, 2018.

(51) Int. Cl.
*G06F 3/041* (2006.01)
*G06F 3/0488* (2013.01)
*G06K 9/00* (2006.01)
*G06F 21/32* (2013.01)
*G06K 9/20* (2006.01)
*H04N 13/368* (2018.01)

(52) U.S. Cl.
CPC .......... *G06F 3/04883* (2013.01); *G06F 21/32* (2013.01); *G06K 9/00067* (2013.01); *G06K 9/00087* (2013.01); *G06K 9/2054* (2013.01); *H04N 13/368* (2018.05)

(58) Field of Classification Search
None
See application file for complete search history.

(56) References Cited

U.S. PATENT DOCUMENTS

| | | | |
|---|---|---|---|
| 10,303,865 B2 * | 5/2019 | Kontsevich | G06F 21/32 |
| 2003/0122782 A1 * | 7/2003 | Yamaguchi | B60R 11/0235 |
| | | | 345/158 |
| 2010/0014711 A1 * | 1/2010 | Camhi | B60Q 3/80 |
| | | | 382/104 |
| 2014/0300542 A1 * | 10/2014 | Jakubiak | G06F 3/0425 |
| | | | 345/157 |
| 2016/0209927 A1 * | 7/2016 | Yamagishi | G06F 3/0304 |

* cited by examiner

*Primary Examiner* — Joseph R Haley

(57) ABSTRACT

A method of operating an electronic system for is provided. The method includes the following actions. A plurality of images are captured by an image capturing unit. An object is detected by a sensor unit within a sensing region. When the object is detected within the sensing region of the sensor unit, a palm feature is recognized by a processing unit from the captured images. An application is stimulated in response to the palm feature.

18 Claims, 11 Drawing Sheets

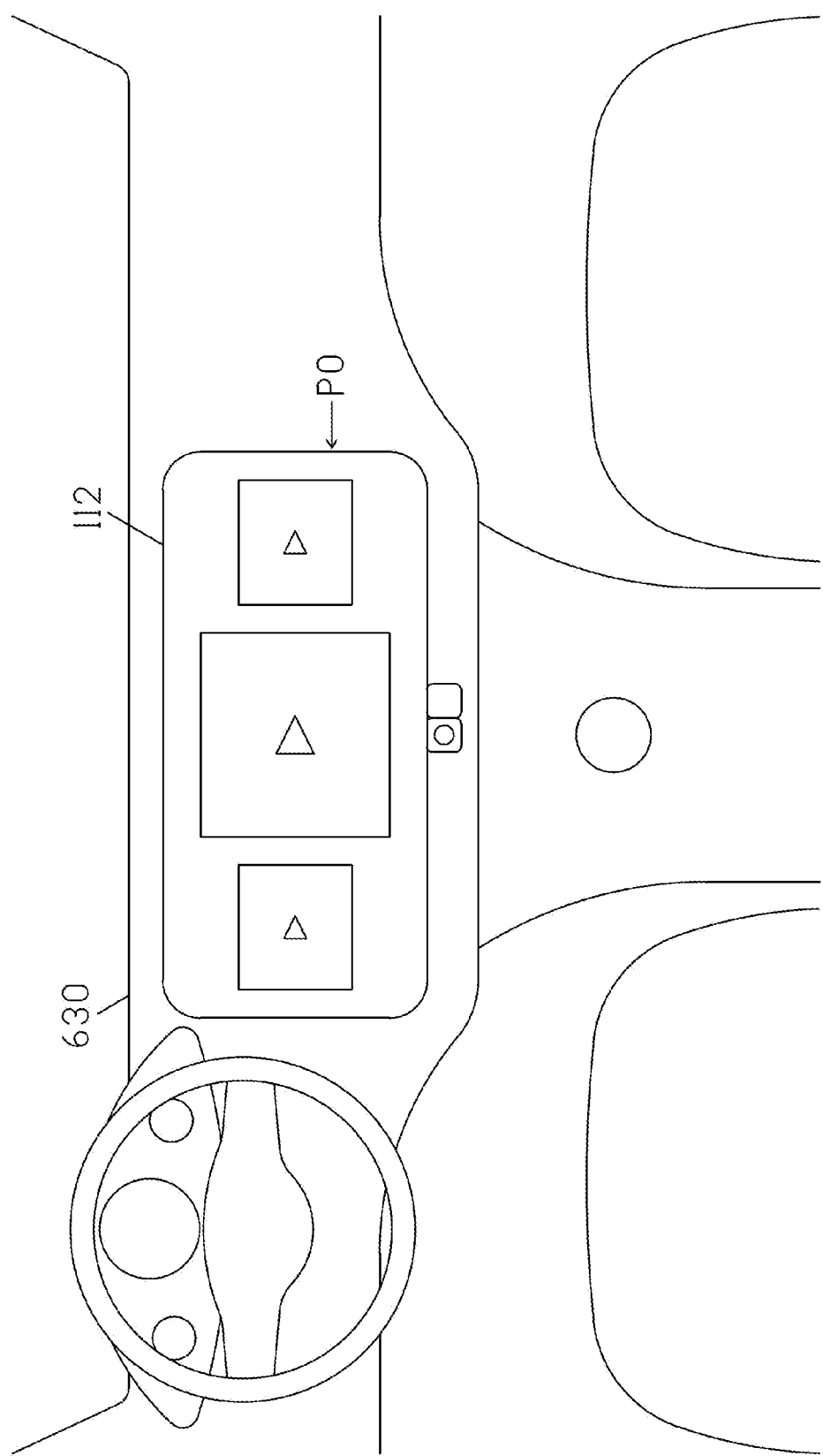

US 10,895,980 B2

ELECTRONIC SYSTEM WITH PALM RECOGNITION, VEHICLE AND METHOD FOR OPERATING THE SAME

CROSS REFERENCE

This application claims the benefit and priority to of U.S. Provisional Application Ser. No. 62/757,744, filed on Nov. 8, 2018, and entitled "CENTRAL CONSOLE, INFOTAINMENT SYSTEM AND OPERATING METHOD WITH A PALM RECOGNITION", which is incorporated herein by reference in its entirety.

FIELD

The present disclosure generally relates to an electronic system with palm recognition, a method for operating the same, and a vehicle with palm recognition.

BACKGROUND

In a vehicle, an infotainment system is embedded in the middle of the car frame between the driver and the passenger. When operating the infotainment system, the driver and the passenger have to reach his or her arm to touch the buttons, control panel or touch screen of the infotainment system. On top of that, when the driver operates the infotainment system, the driver looks away from the road to check the infotainment system, and this kind of distraction puts the driver and passenger(s) at a high risk of a crash. Therefore, it is desirable to provide a convenient and safer infotainment system.

SUMMARY

In one aspect of the present disclosure, a method for operating an electronic system is provided. The method includes the following actions. A plurality of images are captured by an image capturing unit. An object is detected by a sensor unit within a sensing region. When the object is detected within the sensing region of the sensor unit, a palm feature is recognized by a processing unit from the captured images. An application is stimulated in response to the palm feature.

In another aspect of the present disclosure, an electronic system is provided. The electronic system includes an image capturing unit, a sensor unit, and a processing unit. The image capturing unit is configured to capture a plurality of images. The sensor unit is configured to detect an object within a sensing region. The processing unit is configured to recognize a palm feature from the captured images when the object is detected within the sensing region of the sensor unit, and to stimulates an application in response to the palm feature.

In yet another aspect of the present disclosure, a vehicle is provided. The vehicle includes an infotainment system. The infotainment system includes an image capturing unit, a sensor unit, a display device, and a processing unit. The image capturing unit is configured to capture a plurality of images. The sensor is configured to detect an object within a sensing region. The processing unit is configured to recognize a palm feature from the captured images when the object is detected within the sensing region of the sensor unit, and to display an application on the display device in response to the palm feature.

BRIEF DESCRIPTION OF THE DRAWINGS

FIGS. 6A-6D are schematic diagrams of multiple positions of the display device according to an implementation of the present disclosure.

DETAILED DESCRIPTION

Figure 1:
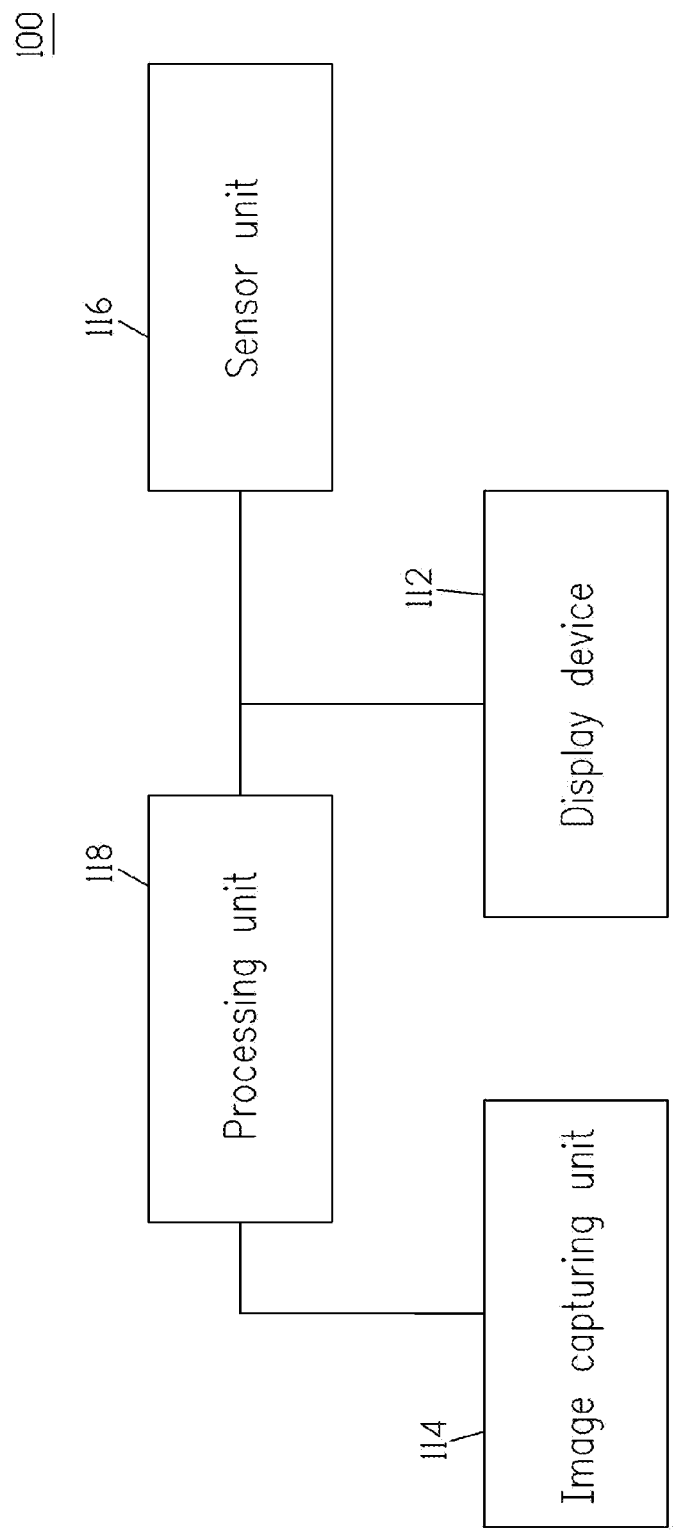
FIG. 1 is a block diagram of an electronic system according to an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

FIG. 1 is a block diagram of an electronic system 100 according to an implementation of the present disclosure. The electronic system 100 includes an image capturing unit 114, a sensor unit 116 and a processing unit 118. The image capturing unit 114 is configured to capture images of a user. In one implementation, the image capturing unit 114 may include, but not limited to, one or more cameras or any device capable of capturing images. The image capturing unit 114 may be a depth-sensing camera with a depth sensor. The camera may be an RGB color camera or an infrared (IR) camera. In some embodiments, the image capturing unit 114 further includes a light source (e.g., an IR projector or a visible light projector) enabling instant profiling of the hand/palm of the user. With the light source and high dynamic range (HDR) imaging, the palm recognition may be adapted to a darker environment.

The sensor unit 116 is configured to detect an object within a sensing region. In one implementation, the sensor unit 116 is a proximity sensor. In another implementation, the sensor unit 116 is realized by a depth sensor of a depth sensing camera.

The processing unit 118 is coupled to the image capturing unit 114 and the sensor unit 116. The processing unit 118 may process data and instructions. In one embodiment, the processing unit 118 may be a hardware module comprising one or more central processing unit (CPU), microcontroller(s), ASIC, or a combination of above but is not limited thereof. The processing unit 118 performs image recognition and image processing to render images. In one embodiment, the processing unit 118 is configured to identify the captured images and perform palm recognition on the captured images. In some embodiments, the processing unit 118 further performs facial recognition, voice recognition and other biometric recognition based on the captured images. In some embodiments, the processing unit 118 further provides driver monitoring function, such as, gaze zone prioritization, fatigue recognition, inattention recognition, and distraction recognition to the driver.

Optionally, the electronic system 100 further includes a display device 112, coupled to the processing unit 118, configured to display images and applications. In one embodiment, the electronic system 100 further includes a machinery configured to control a movement maneuver of the display device 112.

Figure 2:
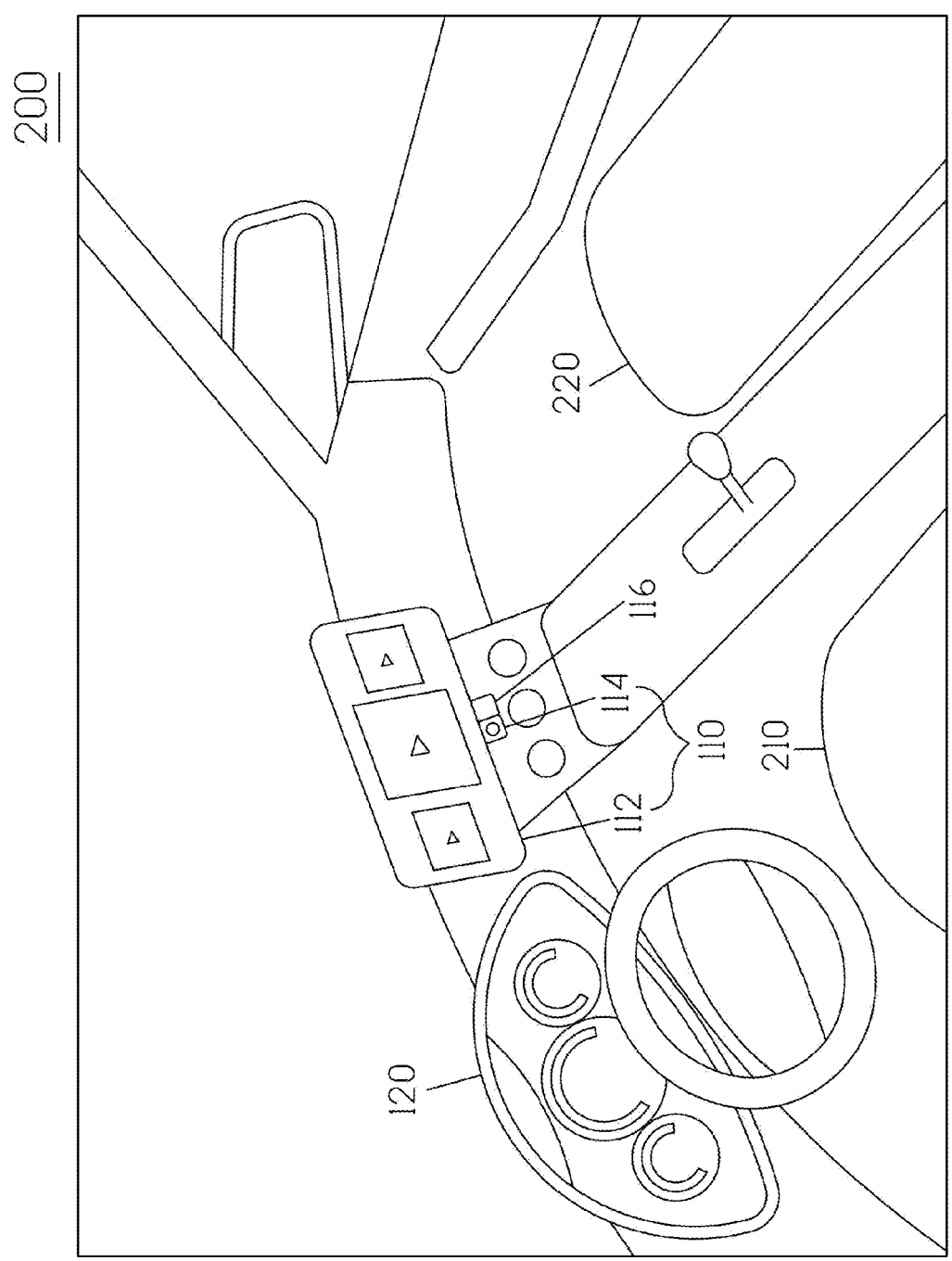
FIG. 2 is a schematic diagram showing the front of the vehicle interior according to an implementation of the present disclosure.

In an exemplary implementation, the electronic system 100 is an in-vehicle infotainment system. In another implementation, the electronic system 100 is a central console of the vehicle. In some other implementations, the electronic system 100 could be any electronic device disposed in the vehicle. FIG. 2 is a schematic diagram 200 showing the front of the vehicle interior an implementation of the present disclosure. As shown in FIG. 2, a driver's seat 210 is located on the left side of the vehicle, while a front passenger seat 220 is located on the right side. However, the driver seating position is not limited on the left side, and may be disposed according to the rule of the road (left-hand traffic or right-hand traffic). A vehicle instrument cluster or a dashboard 120 is arranged directly ahead of the driver's seat 210. The dashboard 120 may include, but not limited to, a speedometer showing a current speed of the vehicle in the middle section, a tachometer showing a rotation speed of the engine of the vehicle on the left of the speedometer, and an odometer showing the distance travelled by the vehicle on the right of the speedometer. In one implementation, the dashboard 120 is a digital dashboard including a digital display panel.

In one embodiment, the infotainment system 110 locates in the center of the front of the vehicle interior as shown in FIG. 2, which is substantially disposed between the driver's seat and the front passenger's seat of a vehicle, so that both the driver and the passenger may share the control of the infotainment system 110. In some embodiments, the infotainment system 110 locates in the center of the back seat so that the backseat passengers could share the control of the infotainment system 110.

As stated above, the infotainment system 110 includes a display device 112, an image capturing unit 114, a sensor unit 116 and a processing unit (not shown). In this implementation, the display device 112 is configured to display applications. The image capturing unit 114 is disposed on the display device 112 to capture the images of the passenger or the driver. In some other implementations, the image capturing unit 114 is not necessarily disposed on the display device 112 but disposed in the vehicle. The sensor unit 116 is disposed on the display device 112. In one embodiment, the processing unit 118 is one of the functional modules of an automotive electronic control unit (ECU). In some other embodiments, the processing unit 116 consolidates the hardware controller in a vehicle for controlling the cluster, in-vehicle infotainment (IVI) system, head-up display (HUD), rear-view mirror, etc.

Figure 3:
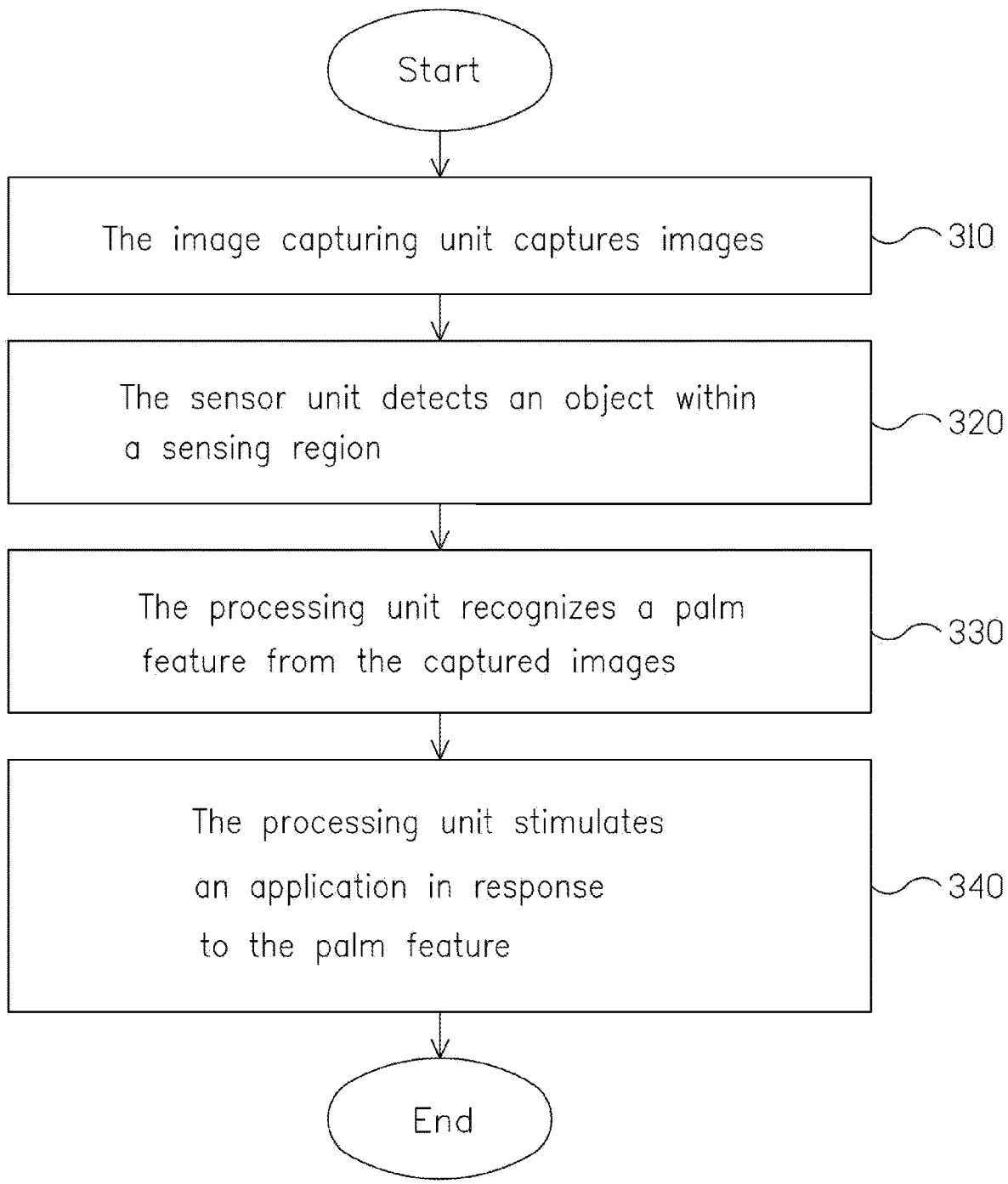
FIG. 3 is a flowchart of the method for operating the electronic system according to an embodiment of the present disclosure.

FIG. 3 is a flowchart of the method for operating the electronic system (e.g., the infotainment system 110) according to an embodiment of the present disclosure. The method includes the following actions. In action 310, the image capturing unit 114 captures images.

In action 320, the sensor unit 116 detects an object within a sensing region. For instance, a proximity sensor detects the presence of nearby objects. When a nearby object is detected within a certain range, the palm recognition will be initiated. In other words, the palm recognition is not performed when a hand is not detected around the display device 112. In this case, the infotainment system 110 could stay in a standby mode when the hand is not detected, and therefore the power consumption could be reduced.

In action 330, the palm recognition is performed. That is, the processing unit 118 recognizes a palm feature from the captured images. For example, the user may enroll palm images in advance. Specifically, the processing unit 118 records and stores the palm feature of the palm images associating with a registered user. In one embodiment, the palm feature may include, but not limited to, a palm print, a fingerprint, a hand pattern, a hand size, a palm size, a finger size, a hand gesture, a palm gesture, a finger gesture a palm attribute or the combination of the above. And when the palm recognition is initiated. And then, the processing unit 118 identifies the palm feature according to, for instance, the position, the pattern, the gesture of one or more parts of a finger, palm and/or hand. In one embodiment, the palm recognition includes a hand gesture, a palm gesture and/or a finger gesture recognition. For instance, the hand gesture may include, but not limited to, pulling up, pushing down, calling over, grabbing, waving, pointing a direction. The palm gesture may include, but not limited to, a closing hand forming a fist, an opening hand, and other positions and gestures by the palm. The finger gesture may include, but not limited to, a thumbs-up, a thumbs-down, the number gestures, and other gestures by moving or folding each finger. The palm attribute is of a right hand or of a left hand. The palm attribute could be identified from the palm images according to all kinds of hand/palm characteristics.

Figure 4:
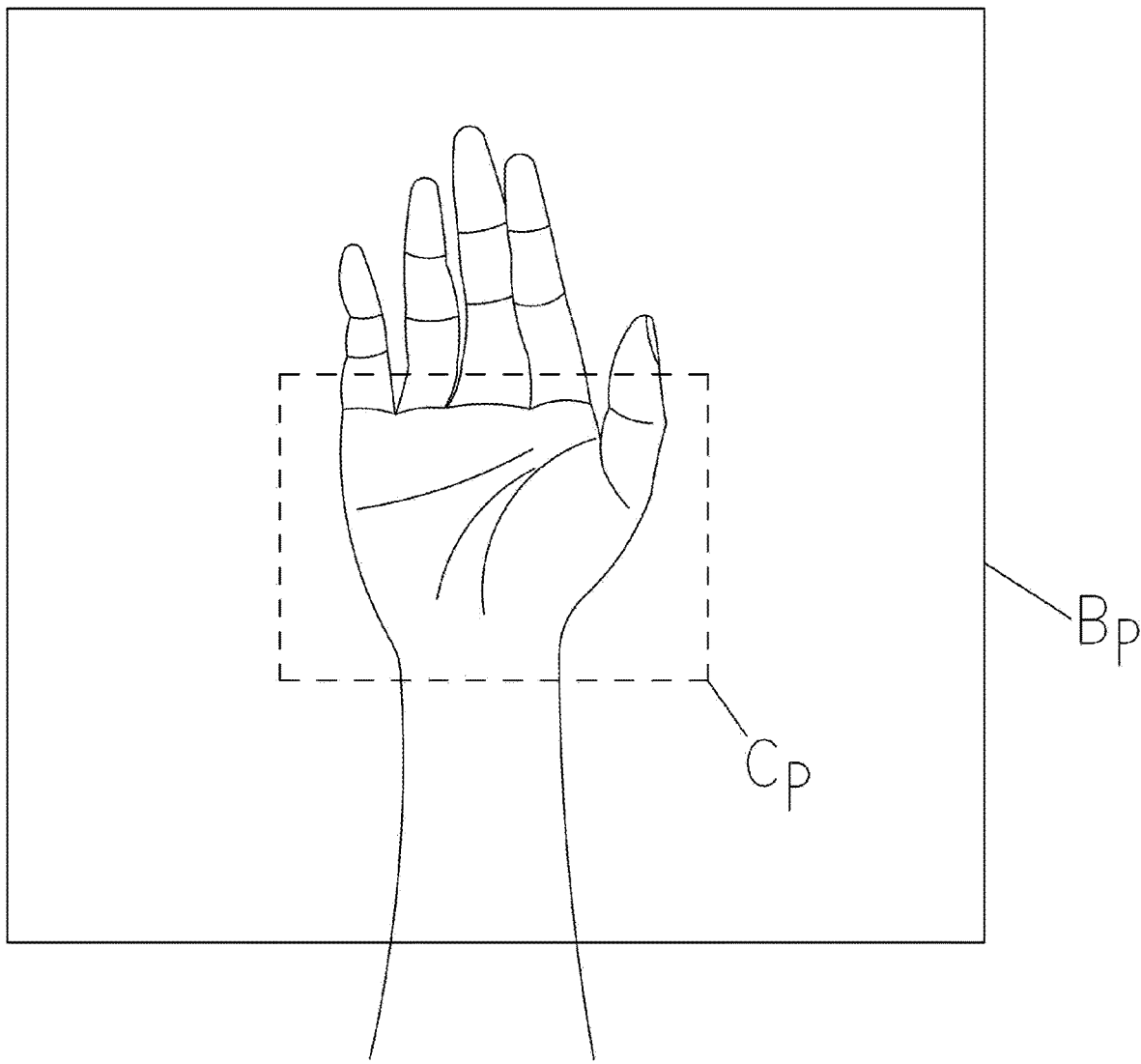
FIG. 4 is a schematic diagram of a captured image including the palm feature according to an implementation of the present disclosure.

In one embodiment, when the palm feature is recognized, the method further includes the following actions. Firstly, the processing unit 118 determines a bounding box of the captured images for tracking the palm. As shown in FIG. 4, a bounding box $B_p$ including the palm region $C_p$ is marked. Next, the palm region $C_p$ is cropped for further identification. Optionally, the palm region is calibrated to a preferred orientation, e.g. upright position, by the image signal processing (ISP) process. Afterwards, the palm feature (e.g., a palm print) is identified from the palm region. Finally, the identified palm feature is used for palm recognition. In addition, the processing unit compares the identified palm feature with the enrolled palm image(s) and recognize a registered user if the result matches.

In action 340, the processing unit 118 stimulates an application in response to the identified palm feature. In one embodiment, each user could pre-configure a default application, and after the palm print is recognized, the processing unit 118 further identifies a user identity according to the palm print, and then provides the corresponding application. The corresponding application could be a personalized applications or functions for each user. In some embodiments, the application is displayed on a display device. For instance, a navigation map is displayed on the display device 112 when the driver's palm is recognized, while a music playing application is stimulated and/or displayed on the display device 112 when a passenger's palm is recognized. Furthermore, personal content (e.g., such as personal music/video playlist, background setting, theme setting or the personalized desktop application) is stimulated and/or displayed according to the recognized palm print.

Figure 5A:
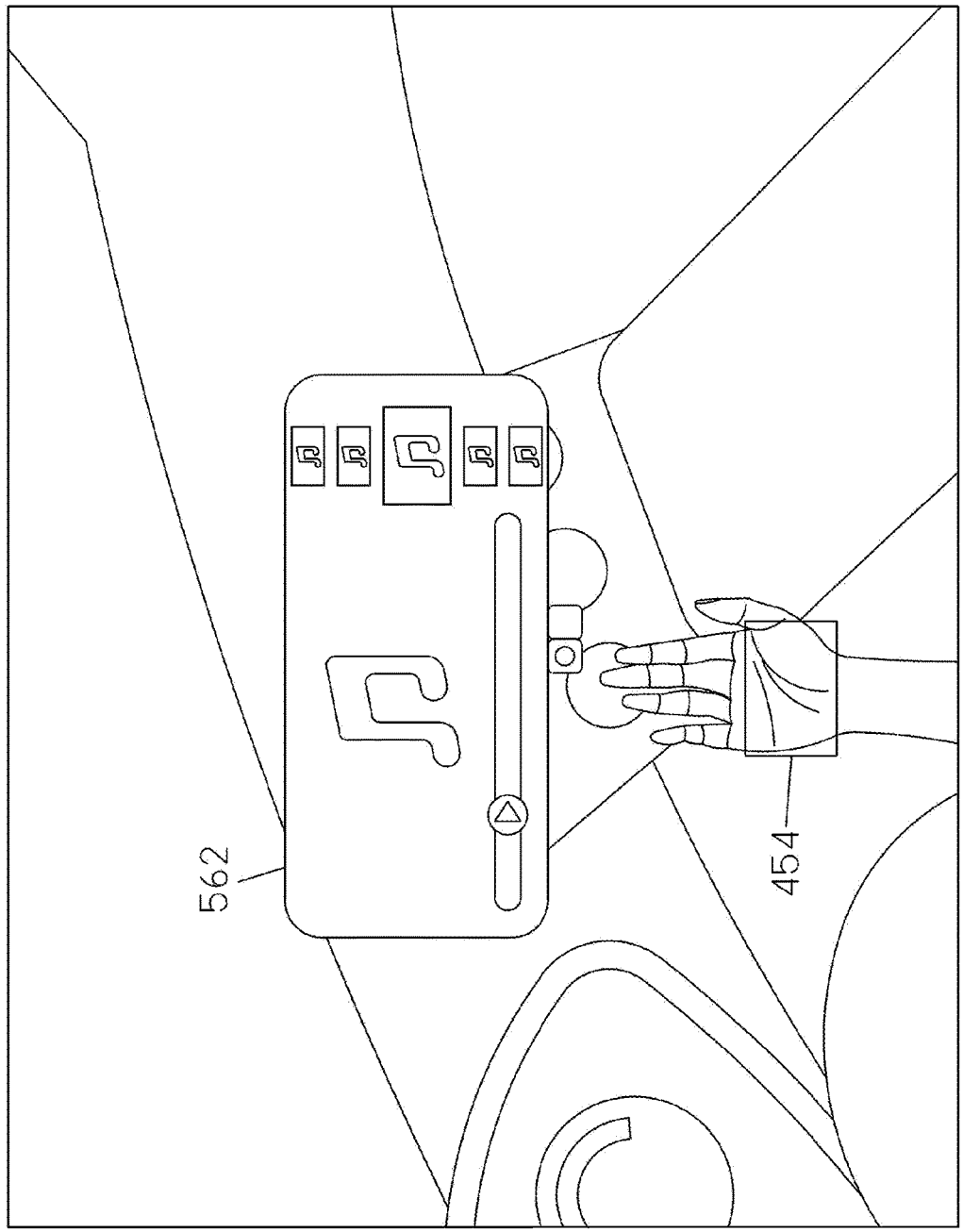
FIG. 5A is a schematic diagram illustrating an implementation of the operation of the infotainment system according to the palm recognition.

FIG. 5A is a schematic diagram illustrating an implementation of the operation of the infotainment system 110 according to the palm recognition. As shown in FIG. 5A, the infotainment system 110 displays a personal content 562, e.g., a personal playlist, on the display device according to the palm print 454 of a user. It is noted that the palm print 454 shown in FIG. 5A is for illustration purposes only; however, in practical situation that the palm recognition is implemented, in order to capture the palm print, the palm needs to face toward the image capturing unit.

In another embodiment, the user could pre-configure one or more palm gestures to represent different applications, and when the specific palm gesture is recognized, the processing unit 118 displays an application on the display device 112 accordingly. For instance, a navigation map is displayed on the displayed device when a closed first is recognized, while a music playing application is displayed on the displayed device when a victory sign gesture is recognized. That is, more gesture (static or dynamic) could be set in advance such that various applications (e.g., navigation map, music playing application, video playing application, call list) could be initiated quickly.

Moreover, the user may control the infotainment system 110 via different gestures. The user may use the hand gesture, the palm gesture and/or the finger gesture to operate the infotainment system, e.g., switching between the applications, selecting and/or performing a function. For example, the user could make a swiping right/left gesture to scroll the application list to the right/left and plays/selects the applications on the left/right. In another example, the user could make a thumbs-up to enter an application or the next level of menu.

Figure 5B:
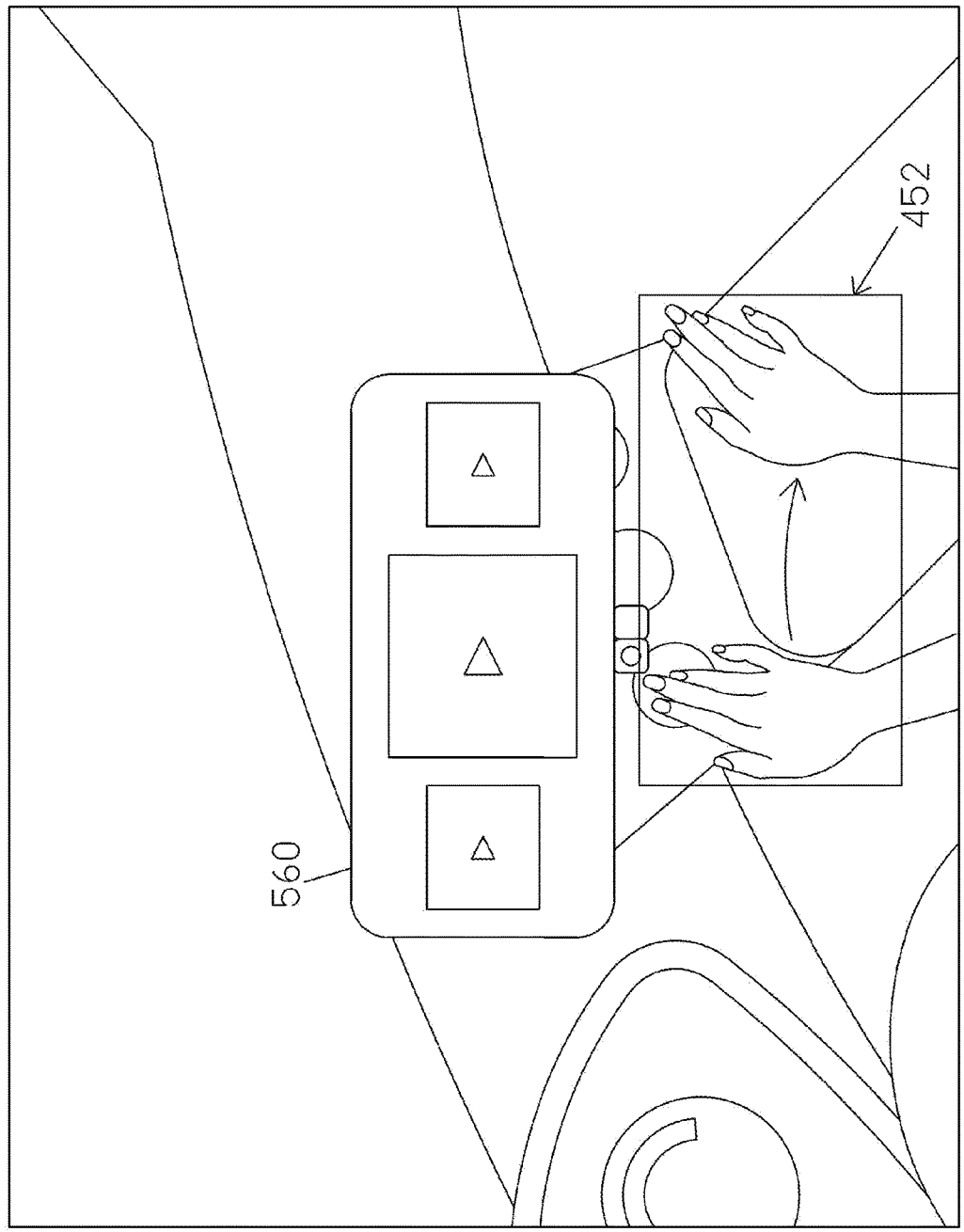
FIG. 5B is a schematic diagram illustrating another implementation of the operation of the infotainment system according to the palm recognition.

FIG. 5B is a schematic diagram illustrating another implementation of the operation of the infotainment system 110 according to the palm recognition. In this embodiment, the infotainment system 110 displays a content 560 on the display device according to the palm gesture 452. Specifically, the palm gesture 452 is a swiping right gesture, and then the displayed application list is scrolling to the right accordingly.

Based on the above, the user may operate the infotainment system 110 remotely without touching the display device 112 of the infotainment system 110. Since the physical contact to the device could be reduced, it is much safer for the driver to operate the system while driving. In some embodiments, although the infotainment system 110 is currently operated by a left seat user, the image capturing unit 114 keeps monitoring the right seat user, and thus the right seat user may also operate the infotainment system at the same time. Therefore, both the driver and the passenger could share the control of the infotainment system easily without physically hanging over the infotainment system 110.

In some embodiments, the display device 112 is movable. Specifically, the position and orientation of the display device 112 may be adjusted to move towards the driver or the passenger according to the user's operation.

Since a conventional central console or infotainment system is fixed in the car frame, the passenger and the driver might have to lean forward or stretch arms to reach a control panel or screen. In contrast, the display device 112 could be moved to a position near the passenger and a position near the driver such that the driver or the passenger could view the display content clearly. In another case that the physical contact to operate the device is required, the display device 112 could be moved to a hand-reachable position for the passenger or the driver to operate the system without leaning forward or stretching arms to reach the control panel or screen. In addition, the display device 112 could be moved a position near the dashboard, or in front of the driver, which is in the peripheral vision of the driver when the driver keeps his/her eyes on the road. As such, the infotainment system 110 is designed to make the operation more convenient for both the driver and the passenger. Also, it is much safer for the driver to keep the distraction to its lowest while driving.

Figure 6B:
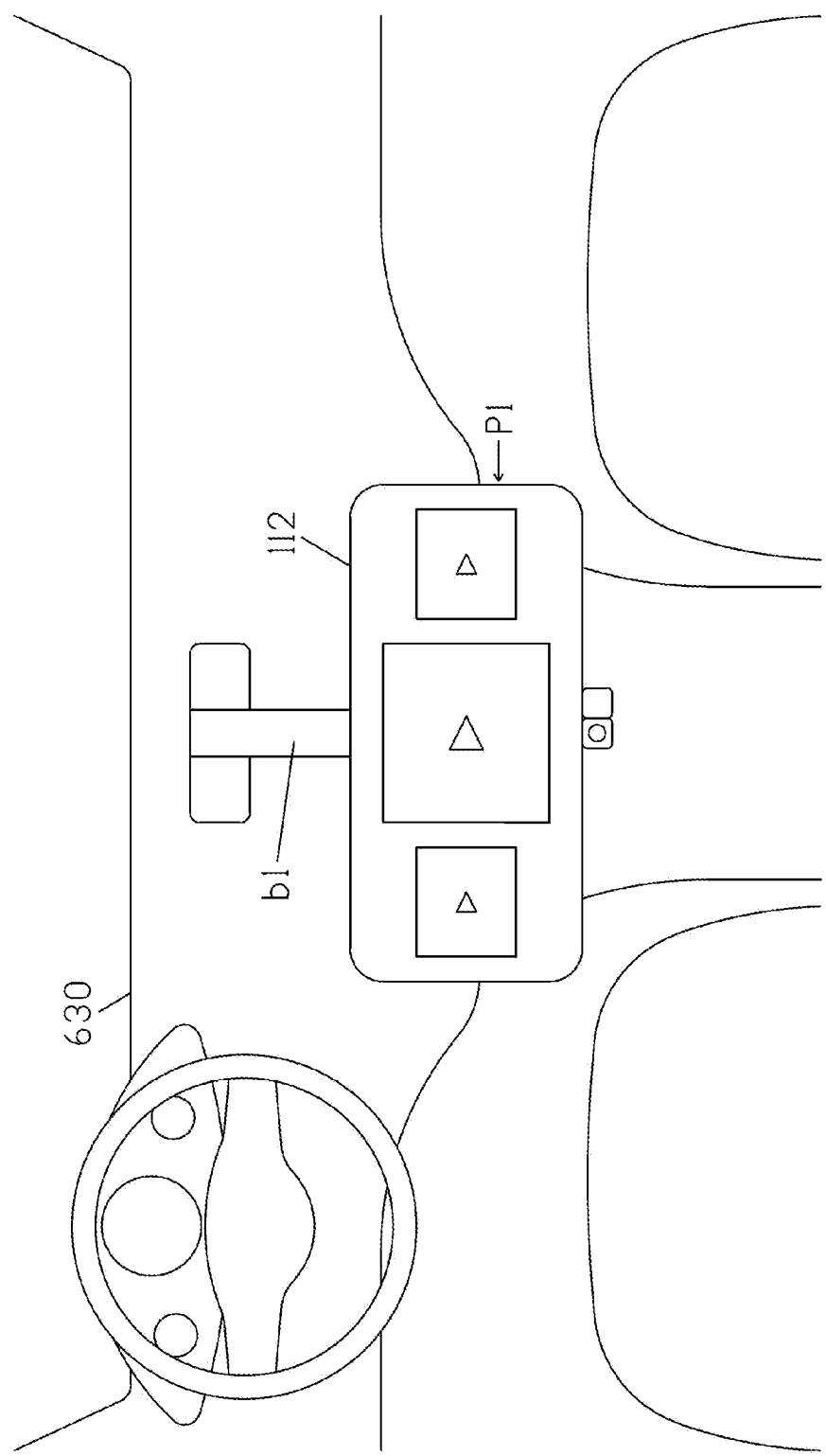

FIGS. 6A-6D are schematic diagrams of multiple positions of the display device 112 according to an implementation of the present disclosure. In this implementation, the machinery for controlling the movement maneuver of the display device is a movable supporting bracket. However, the present disclosure is not limited thereto. The machinery may use any kinds of elements or structures to adjust the orientation of the display device and move the position of the display device. As shown in FIG. 6A, initially, the display device 112 locates at a position P0, which is embedded in the car frame 630 via a movable supporting bracket (not shown). For instance, after the infotainment system 110 is turned on, the display device 112 moves to a position P1 by stretching the supporting bracket b1 to the front as shown in FIG. 6B. In one implementation, the infotainment system 110 is turned on when a sensor unit detects that a hand/palm is within a sensing region. In another implementation, the infotainment system 110 is turned on when a pulling up gesture made by a user is detected.

Figure 6C:
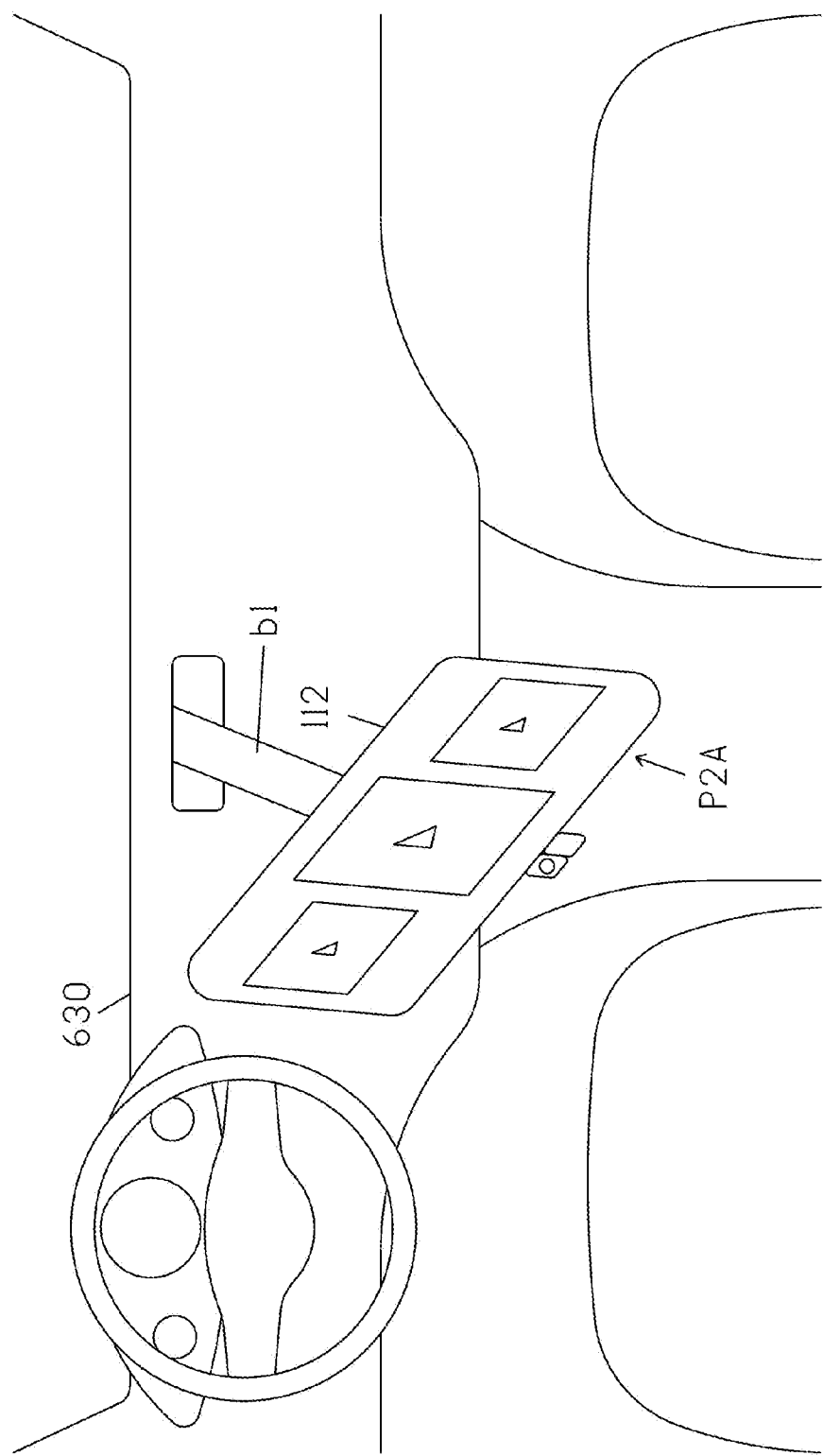
Figure 6D:
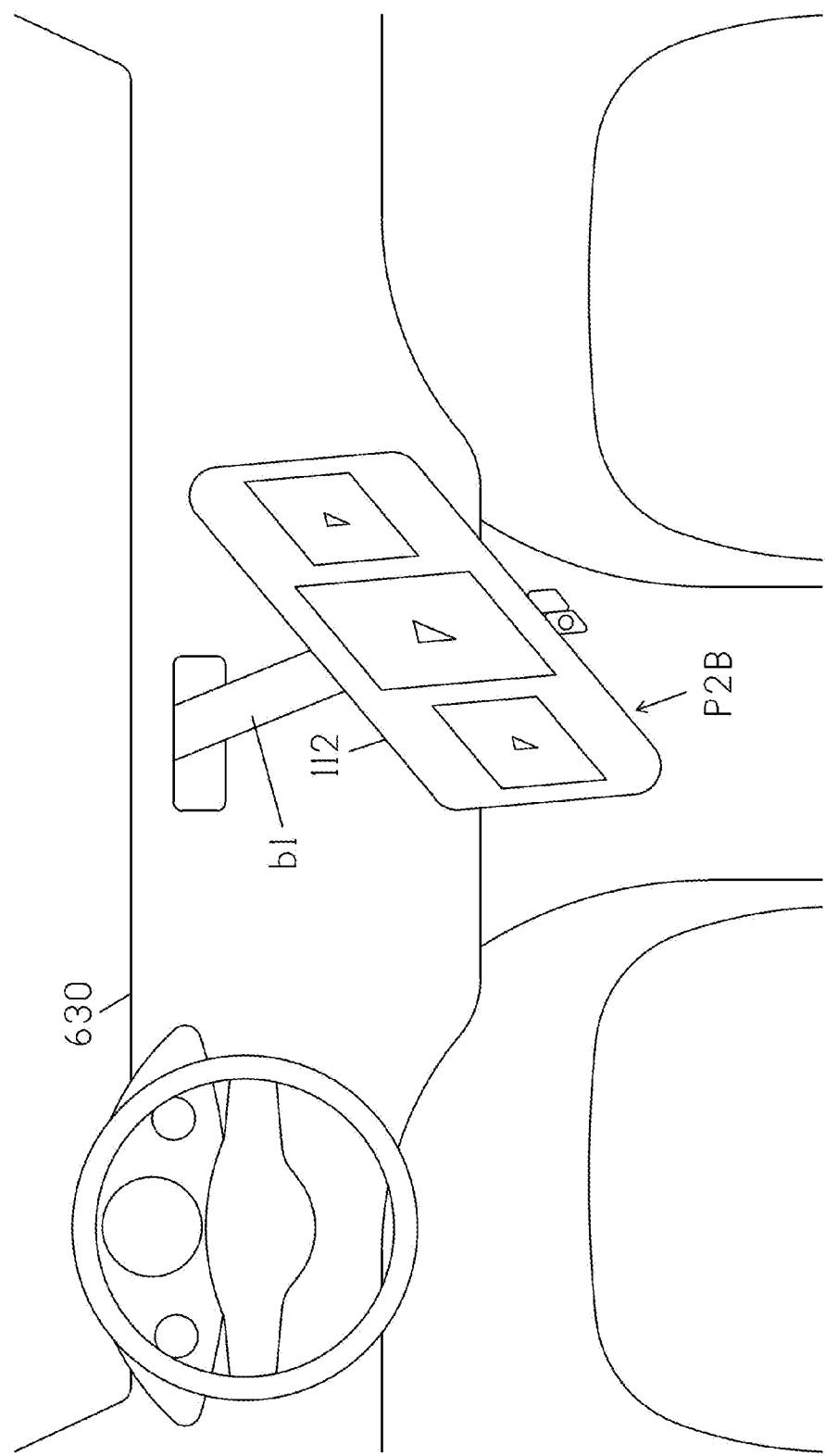

Afterwards, the display device 112 moves to the hand-reachable position of the user. For instance, the infotainment system 110 rotates the supporting bracket b1 to move the display device 112 to a position P2A in front of a left seat user (e.g., the driver) and an orientation facing towards the user on the left seat (e.g., the driver) as shown in FIG. 6C. Alternatively, as shown in FIG. 6D, the infotainment system 110 rotates the supporting bracket b1 to move the display device 112 to a position P2B in front of the right seat user (e.g., the passenger) and an orientation facing towards the user on the right seat (e.g., the passenger).

Figure 7:
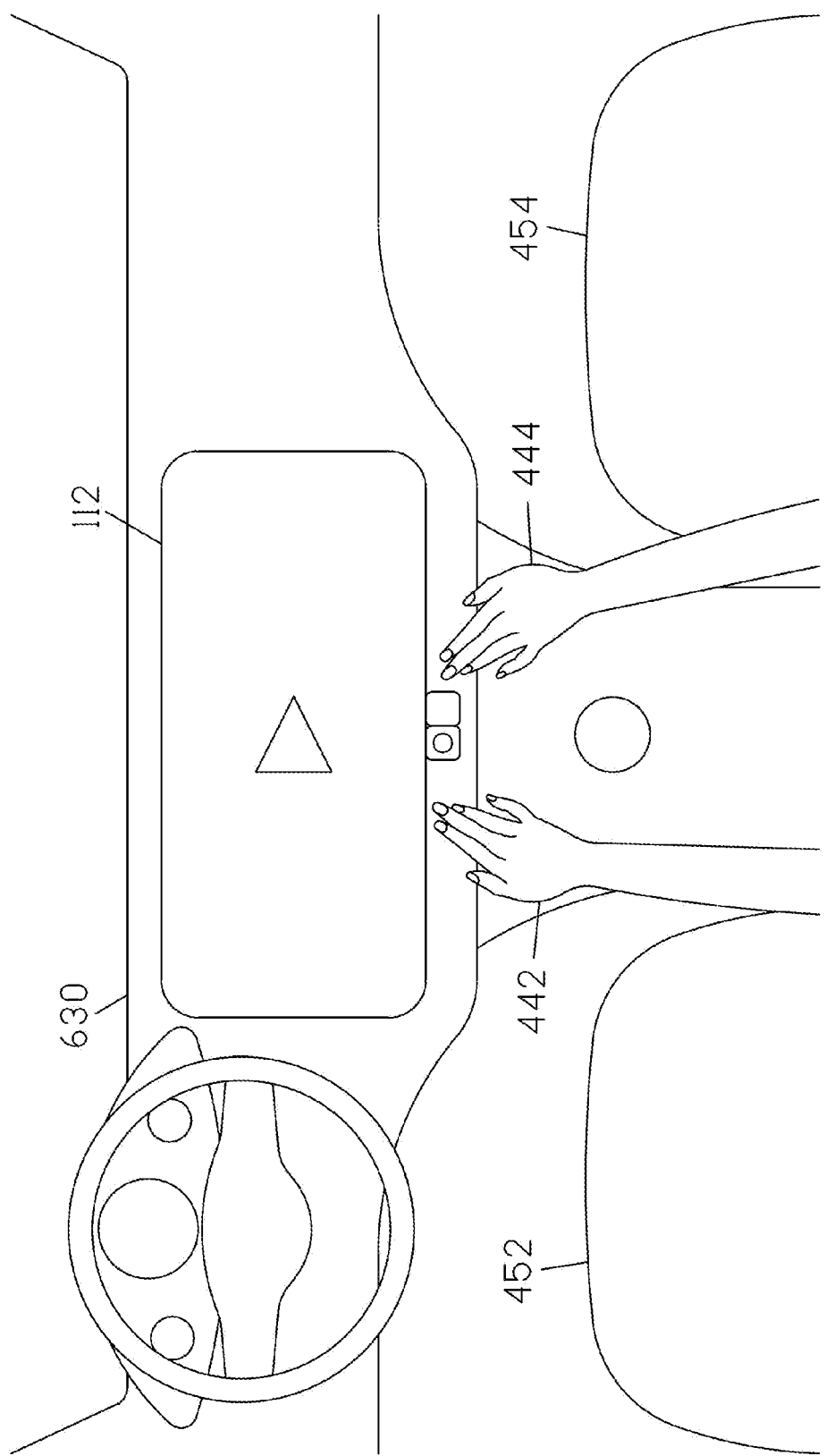
FIG. 7 is a schematic diagram of one implementation of the operation of the infotainment system in response to the palm recognition.

The display device 112 may move to the left side for the left seat user or to the right side for the right seat user according to the palm recognition. FIG. 7 is a schematic diagram of one implementation of the operation of the infotainment system in response to the palm recognition. In one embodiment, the processing unit 116 further obtains a palm position of the identified palm based on the image captured by the image capturing unit 114, and determines the target position of the display device in response to the palm position. For example, when the processing unit 116 determines that the identified palm locates near the left seat region (e.g., 452), the display device 112 moves to a hand-reachable position of the left seat user (e.g., P2A). Similarly, when the processing unit 116 determines that the identified palm locates near the right seat region (e.g., 454), the display device 112 moves to a hand-reachable position of the right seat user (e.g., P2B).

In another embodiment, the processing unit determines the movement maneuver of the display device according to the palm attribute. Since the infotainment system 110 is on the right side of the left seat user, it is more natural for the left seat user to use the right hand to operate the infotainment system 110; and therefore when the processing unit 116 identifies that the palm attribute is of a right hand (e.g., 442), the display device 112 moves to a hand-reachable position of the left seat user (e.g., P2A). Similarly, when the processing unit 116 identifies that the palm attribute is of a left hand (e.g., 444), the display device 112 moves to a hand-reachable position of the right seat user (e.g., P2B). Moreover, after the determination of the palm attribute is of a right hand or a left hand, different application could be displayed for the left seat user or the right seat user accordingly.

In some embodiments, although the display device 112 is at a position near a left seat user, the image capturing unit 114 keeps monitoring the right seat user, and thus the right seat user may also operate the infotainment system 110 at the same time without touching the infotainment system 110.

In some other embodiments, the movement maneuver of the display device 112 is determined according to a palm gesture made by the user. For instance, the user could make a palm gesture by waving his/her palm (e.g., leftward, rightward, upward, downward, forward, backward, or any combination of the above), and the processing unit 118 determines a movement maneuver of the display device 112 according to the palm gesture and controls the display device 112 to move accordingly. Specifically, the user could use palm gesture to move, tilt and/or rotate the display device 112, thereby adjusting the display device 112 to the desirable position and/or the desirable orientation.

In some embodiments, when the driver is operating the infotainment system 110, the processing unit 118 performs driver monitoring function, such as, gaze zone prioritization, fatigue recognition, inattention recognition, and distraction recognition to the driver. For instance, the image capturing unit 114 keeps capturing images of the drivers, and the processing unit 118 monitors a state of a driver by tracking the eye gaze, the blinking, or the head pose of the driver or other facial features. The state of the driver is further used for determining the distraction level, response time and fatigue of the driver. The state of the driver may include, for example, sleepy or not, and concentrate on the road or not. In one implementation, when the processing unit 116 determines that the driver is distracted or tired (e.g., when the distraction level exceeds a threshold), the display device 112 displays a warning sign on the screen. In another implementation, when the processing unit 116 determines that the driver is distracted or tired, the display device 112 of the infotainment system 110 is turned off. In some other implementations, even though the same application is performed and displayed on the display device 112, when the driver is operating the infotainment system 110, the driving information is displayed on a part of the screen. Therefore, the driver could interact safely with the infotainment system 110 while driving.

Based on the above, several electronic systems and methods for operating an electronic system are provided in the present disclosure. The implementations shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for operating an electronic system, comprising:
    capturing, by an image capturing unit, a plurality of images;
    detecting, by a sensor unit, an object within a sensing region;
    recognizing, by a processing unit, a palm feature from the captured images when the object is detected within the sensing region of the sensor unit;
    stimulating, by the processing unit, an application in response to the palm feature, wherein the palm feature includes a palm gesture;
    determining, by the processing unit, a movement maneuver of a display device according to directional information of the palm gesture; and
    moving, by the processing unit, the display device to a desirable position and a desirable orientation according to the movement maneuver.

2. The method of claim 1, wherein the palm feature includes a palm print, and the step of recognizing the palm feature from the captured images further comprises:
    determining, by the processing unit, a bounding box including a palm region; and
    identifying, by the processing unit, the palm print from the bounding box including the palm region.

3. The method of claim 1, wherein the palm feature includes a palm print, and the method further comprises:
    identifying, by the processing unit, a user identity according to the palm print;
    wherein the stimulated application corresponds to the user identity.

4. The method of claim 1, wherein the palm feature includes a palm attribute, and the method further comprises:
    determining, by the processing unit, whether the palm attribute is of a right hand or a left hand;
    wherein a first application is performed when the palm attribute is of the right hand, and a second application is performed when the palm attribute is of the left hand.

5. The method of claim 4, further comprising:
    determining, by the processing unit, the movement maneuver of a display device according to the palm attribute;
    wherein the display device is moved to a first orientation and a first position when the palm attribute is of the right hand, and the display device is moved to a second orientation and a second position when the palm attribute is of the left hand.

6. The method of claim 5, wherein the electronic system is substantially disposed between a driver's seat and a front passenger's seat of a vehicle, and the first position is in front of a left seat of the vehicle, and the second position is in front of a right seat of the vehicle.

7. The method of claim 3, wherein the stimulated application corresponds to the user identity is a personalized desktop application on a display device.

8. An electronic system, comprising:
    an image capturing unit configured to capture a plurality of images;
    a sensor unit configured to detect an object within a sensing region;
    a display device;
    a machinery configured to control a movement maneuver of the display device; and
    a processing unit configured to perform instructions for:
        recognizing a palm feature from the captured images when the object is detected within the sensing region of the sensor unit;
        stimulating an application in response to the palm feature, wherein the palm feature includes a palm gesture;
        determining the movement maneuver of the display device according to directional information of the palm gesture; and moving the display device to a desirable position and a desirable orientation according to the movement maneuver.

9. The electronic system of claim 8, wherein the palm feature includes a palm print, and when the palm feature is recognized, the processing unit is further configured to perform instructions for:
determining a bounding box including a palm region; and
identifying the palm print from the bounding box including the palm region.

10. The electronic system of claim 8, wherein the palm feature includes a palm print, and the processing unit is further configured to perform instructions for:
identifying a user identity according to the palm print;
wherein the stimulated application corresponds to the user identity.

11. The electronic system of claim 8, wherein the palm feature includes a palm attribute, and the processing unit is further configured to perform instructions for:
determining whether the palm attribute is of a right hand or a left hand;
wherein a first application is performed when the palm attribute is of the right hand, and a second application is performed when the palm attribute is of the left hand.

12. The electronic system of claim 11,
wherein the processing unit is further configured to perform instructions for:
determining the movement maneuver of the display device according to the palm attribute;
wherein the display device is moved to a first orientation and a first position when the palm attribute is of the right hand, and the display device is moved to a second orientation and a second position when the palm attribute is of the left hand.

13. The electronic system of claim 12, wherein the electronic system is substantially disposed between a driver's seat and a front passenger's seat of a vehicle, and the first position is in front of a left seat of the vehicle, and the second position is in front of a right seat of the vehicle.

14. The electronic system of claim 10, wherein the stimulated application corresponds to the user identity is a personalized desktop application on a display device.

15. A vehicle, comprising:
an infotainment system comprising:
an image capturing unit configured to capture a plurality of images;
a sensor unit configured to detect an object within a sensing region;
a display device;
a machinery configured to control a movement maneuver of the display device; and
a processing unit configured to perform instructions for:
recognizing a palm feature from the captured images when the object is detected within the sensing region of the sensor unit;
displaying an application on the display device in response to the palm feature, wherein the palm feature includes a palm gesture;
determining the movement maneuver of the display device according to directional information of the palm gesture; and
moving the display device to a desirable position and a desirable orientation according to the movement maneuver.

16. The vehicle of claim 15, wherein the processor is further configured to:
monitoring a state of a driver in the vehicle;
determining a distraction level of the driver according to the state of the driver; and
turning off the infotainment system when the distraction level exceeds a threshold.

17. The vehicle of claim 15, wherein the processor is further configured to:
identifying a user identity according to the palm feature;
providing a first content when the user identity corresponds to a driver; and
providing a second content when the user identity corresponds to a passenger.

18. The vehicle of claim 15,
wherein the display device is moved to a first orientation and a first position in front of a driver seat or a second orientation and a second position in front of a passenger seat.

* * * * *